No. 608,542. Patented Aug. 2, 1898.
J. F. BENOIT.
PICKER STAFF FOR LOOMS.
(Application filed Nov. 19, 1897.)
(No Model.)
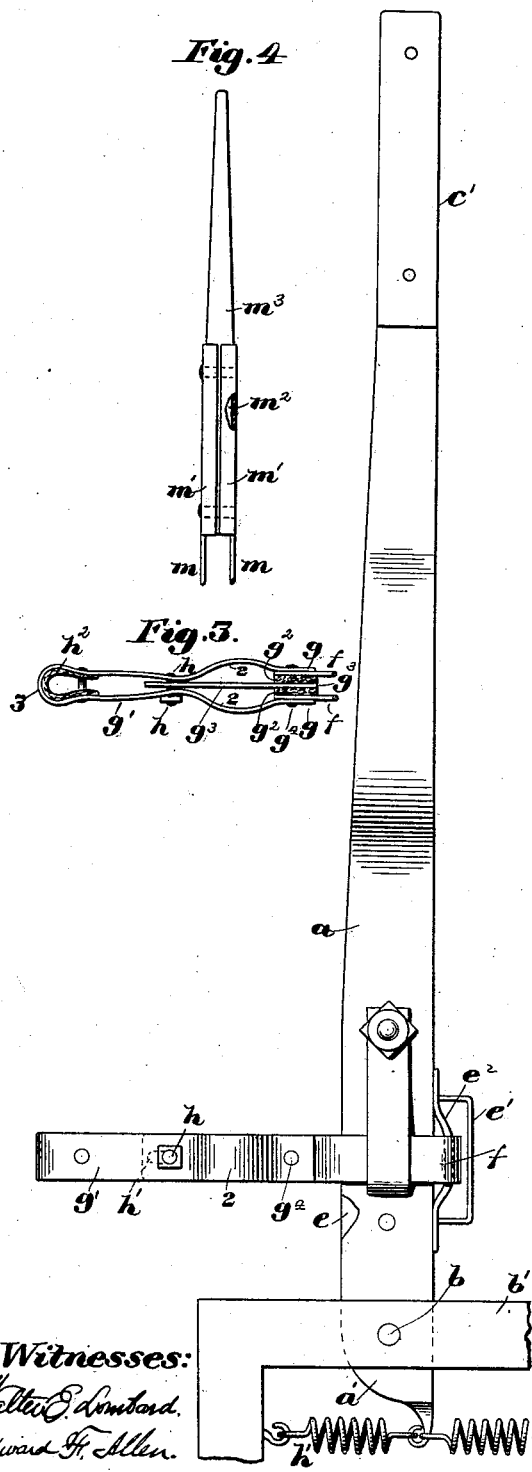
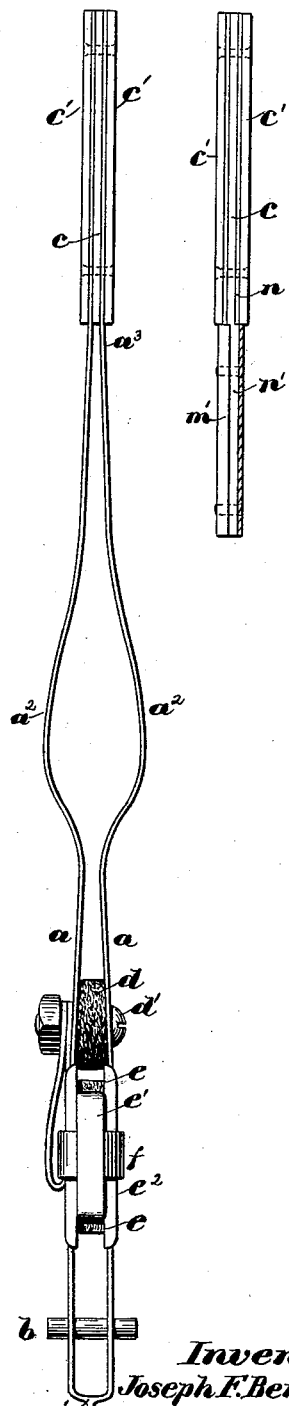
Witnesses:
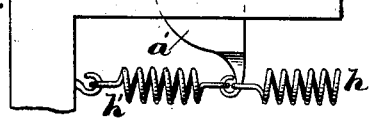
Inventor:
Joseph F. Benoit,
by Crosby & Gregory
Attys.

UNITED STATES PATENT OFFICE.

JOSEPH F. BENOIT, OF SANFORD, MAINE, ASSIGNOR OF ONE-HALF TO GEORGE B. GOODALL AND HERBERT J. HOPE, OF SAME PLACE.

PICKER-STAFF FOR LOOMS.

SPECIFICATION forming part of Letters Patent No. 608,542, dated August 2, 1898.

Application filed November 19, 1897. Serial No. 659,075. (No model.)

*To all whom it may concern:*

Be it known that I, JOSEPH F. BENOIT, of Sanford, county of York, State of Maine, have invented an Improvement in Picker-Staves for Looms, of which the following description, in connection with the accompanying drawings, is a specification, like letters on the drawings representing like parts.

Wooden picker-sticks, such as now commonly in use in looms, to present sufficient strength have to be made quite heavy and very stiff and very considerable power has to be expended in starting them, due to their weight, and the sticks are commonly embraced or surrounded near their upper or free ends by a picker of leather or other material, thus making the stick top-heavy.

I have aimed to produce a very strong and yet a very light-weight staff to take the place of the usual wooden stick.

My improved picker-staff is composed of a plurality of separate independent thin metallic blades, one of which acts to stiffen the other, and these blades carry at their upper ends a shuttle contact-piece, it meeting the conical point or tip of the usual shuttle to impel it across the lay.

My improved staff may yield somewhat laterally, and it is also so constructed that in actuating the shuttle it strikes a yielding blow, which acts gradually to impel the shuttle, such a blow tending to avoid shocks which would cause the filling to move on the shuttle-spindle. The metallic blades are bulged between their ends to thus add to the elasticity of the staff.

Figure 1, in side elevation, represents a picker-staff embodying one form of my invention. Fig. 2 is an edge view thereof. Fig. 3 is a top view of the picker-staff strap, and Figs. 4 and 5 are modifications to be described.

The staff is composed of two thin sheet-metal blades or arms $a\ a$, preferably of spring-steel, said blades being shown as connected at their lower ends, and this connection may be made as at $a'$, or the blades may be connected at or near their lower ends in any suitable manner below the fulcrum $b$ of the staff, said fulcrum being mounted on a suitable extension $b'$, supposed to be connected to and moving with the lay in any usual manner.

The metallic blades $a\ a$ are extended upwardly above the fulcrum $b$ and are, as shown, bent outwardly or bulged, as at $a^2$, and above that point they are brought again nearer together, as at $a^3$, the upper portion of the blades bearing the non-metallic material $c$, which may be rawhide, leather, wood, or other suitable material, which meets the usual metallic point or cone of the shuttle, said blades when extended into the usual slot of the lay being preferably provided externally with non metallic wear-plates $c'\ c'$, said wear-plates also stiffening the staff at or in line with that part of it which contacts with the shuttle.

The bulge part $a^2$ of the blades constitutes a yielding section of such character that when the shuttle is struck to throw it from its box at one end of the lay the blow delivered will be a spring or yielding blow, it yielding sufficiently to avoid shocks, but the staff does not appreciably stop, for it follows sharply by its own movement the blow and impels the shuttle across the lay into the other box, where, meeting a like staff, the slight yielding of the staff again insures the checking of the shuttle in a yielding manner.

In practice the part $c$, which directly meets the conical point of the shuttle, is broad enough to act on said point and impel the shuttle without the parts $a^3$ of the blades $a\ a$ touching the said point; but as the shuttle-point wears a hole into the part $c$ said hole may by such wear become so deep that the sides of the point may finally meet some part of the sides of the blades at $a^3$.

The blades $a\ a$ are held pinched together below the bulged parts $a^2\ a^2$ against a leather or other yielding washer $d$ by a suitable bolt $d'$, and below this washer said blades are separated by a block of wood or other suitable, preferably non-metallic, material $e$, into which is entered the legs of a staple or loop $e'$, said loop having inclosed inside of it a spring-bridge $e^2$, the ends of which are shown as forked to embrace the ends of the loop, the loop retaining the spring-bridge in place.

In the space between the said spring-bridge and the loop is passed a short leather strap $f$, the free ends of which (see Fig. 3) are placed between the free ends of a metallic loop $g'$, it, with the strap $f$, constituting the picker-staff strap $g'$, said figure also showing two leather washers $g^2$, placed between the ends of the strap $f$, the latter lying between the ends of the loop $g'$, the said washers having between them a metallic link $g^3$, the loop $g'$, strap $f$, washers, and link being securely held together by means of a suitable bolt $g^4$.

The part $g'$ of the picker-staff strap is bent at 2 (see Fig. 3) to constitute a yielding portion, so that said picker-staff strap may be extended somewhat in the direction of its length on the occasion of any excessive strains, the degree of such strains being limited by the link $g^3$, which is slotted at one end, as at $h'$, to embrace a suitable stud or bolt $h$, inserted through the side walls of the loop $g'$, the opposite end of said link being held by a bolt $g^4$.

The bent part or eye 3 of the loop $g'$ receives in it a leather or other strap $h^2$, against which may act any usual arm operated by the loom to intermittingly move the picker-staff and throw the shuttle, said arm not being herein shown, as it is and may be all as common to other looms.

As a modification of my invention the ends of the two metallic blades shown in Fig. 4, said blades being designated by the letter $m$, may be flanged at opposite edges, as at $m'$, thus leaving a box or chamber in which may be inserted the foot $m^2$ of any suitable non-metallic part $m^3$, adapted to contact with the tip of the shuttle to throw the same.

If desired, the part $e$, hereinbefore described to strike the point of the shuttle, may be held by a suitable holder $n$, (see the modification Fig. 5,) and the shank $n'$ of this holder may be inserted in the flanged upper ends of the blades shown in Fig. 4.

Prior to my invention I am not aware that a metallic picker-staff has ever been made of a plurality of separate independent thin blades and so long that it is adapted to strike a yielding blow.

The springs $h\ h'$ operate to maintain the picker-staff in its normal position. Such springs, being old and common in looms, need not be herein further described.

Having described my invention, what I claim as new, and desire to secure by Letters Patent, is—

1. A picker-staff composed of a plurality of separate, independent thin metallic blades connected together and provided at their upper ends with non-metallic material to contact with the tip or point of the shuttle, substantially as described.

2. A picker-staff composed of a plurality of thin metallic blades connected together and bulged outwardly between the ends of the staff to constitute a yielding or spring portion, substantially as described.

3. A picker-staff composed of sheet-metal blades having between them a non-metallic block, as $d$, combined with a loop, as $e'$, and a spring-bridge $e^2$ against which the picker-staff strap works, substantially as described.

4. The herein-described picker-staff strap composed of a metallic loop $g'$, a yielding or leather strap $f$, a link $g^3$ lying inside the metallic loop and united at one end to the said two loops, and having a slot at its other end to receive a pin or stud extended through the loop $g'$, substantially as described.

In testimony whereof I have signed my name to this specification in the presence of two subscribing witnesses.

JOSEPH F. BENOIT.

Witnesses:
EDWARD E. HUSSEY,
SAMUEL O. NICHOLLS.